US010243749B2

(12) United States Patent
Park et al.

(10) Patent No.: US 10,243,749 B2
(45) Date of Patent: Mar. 26, 2019

(54) PHYSICALLY UNCLONABLE FUNCTION CIRCUIT, AND SYSTEM AND INTEGRATED CIRCUIT INCLUDING THE SAME

(71) Applicant: SAMSUNG ELECTRONICS CO., LTD., Suwon-si (KR)

(72) Inventors: Sang-wook Park, Hwaseong-si (KR); Dae-hyeon Kim, Suwon-si (KR); Mi-jung Noh, Yongin-si (KR); Bohdan Karpinskyy, Suwon-si (KR); Yong-ki Lee, Yongin-si (KR); Yun-hyeok Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/871,306

(22) Filed: Jan. 15, 2018

(65) Prior Publication Data
US 2018/0337793 A1     Nov. 22, 2018

(30) Foreign Application Priority Data

May 16, 2017   (KR) .................. 10-2017-0060680
Sep. 13, 2017   (KR) .................. 10-2017-0117230

(51) Int. Cl.
*H04L 9/32*    (2006.01)
*H04L 9/08*    (2006.01)
*H03K 19/003*  (2006.01)

(52) U.S. Cl.
CPC ......... *H04L 9/3278* (2013.01); *H03K 19/003* (2013.01); *H04L 9/0866* (2013.01)

(58) Field of Classification Search
CPC .... H04L 9/3278; H04L 9/0866; H03K 19/003
USPC ............................................................ 326/8
See application file for complete search history.

(56) References Cited

U.S. PATENT DOCUMENTS

| 7,719,288 | B2 | 5/2010 | Crick |
| 8,415,969 | B1 | 4/2013 | Ficke et al. |
| 8,941,405 | B2 | 1/2015 | Chi et al. |
| 9,018,972 | B1* | 4/2015 | Gurrieri ............... H03K 19/003 326/8 |
| 9,088,278 | B2 | 7/2015 | Pfeiffer et al. |
| 9,485,094 | B1 | 11/2016 | Parvarandeh et al. |
| 9,577,637 | B2 | 2/2017 | Pedersen |
| 2011/0317829 | A1* | 12/2011 | Ficke ..................... H04L 9/3278 380/46 |
| 2012/0183135 | A1* | 7/2012 | Paral ..................... H04L 9/0866 380/44 |

(Continued)

FOREIGN PATENT DOCUMENTS

| EP | 2779067 A1 | 9/2014 |
| KR | 10-1359783 B1 | 2/2014 |
| KR | 10-1408619 B1 | 6/2014 |

*Primary Examiner* — Daniel D Chang
(74) *Attorney, Agent, or Firm* — Sughrue Mion, PLLC

(57) ABSTRACT

A physical unclonable function (PUF) circuit and a PUF system including the same are provided. The PUF circuit includes a plurality of PUF cells each configured to generate an output voltage by dividing a power voltage, a reference voltage generator configured to generate a first reference voltage by dividing the power voltage, and a comparing unit configured to sequentially compare the output voltages of the plurality of PUF cells with the first reference voltage to output data values of the plurality of PUF cells.

20 Claims, 15 Drawing Sheets

(56) References Cited

U.S. PATENT DOCUMENTS

| | | |
|---|---|---|
| 2014/0279532 A1 | 9/2014 | Tremlet |
| 2016/0188296 A1 | 6/2016 | Plusquellic |
| 2016/0328578 A1 | 11/2016 | Plusquellic et al. |
| 2016/0337123 A1 | 11/2016 | Seok et al. |
| 2017/0180140 A1* | 6/2017 | Mai ................... H04L 9/3278 |

* cited by examiner

FIG. 4B

|  | VR1 | VR2 | VR3 | VR4 |
|---|---|---|---|---|
| RST2 (with Vref_H) | 0 | 0 | 0 | 1 |
|  | ⊗ | ⊗ | ⊗ | ⊗ |
| RST3 (with Vref_L) | 0 | 1 | 1 | 1 |
|  | ⇓ | ⇓ | ⇓ | ⇓ |
| VS (Validity) | 1 | 0 | 0 | 1 |

FIG. 4C

|  | VR1 | VR2 | VR3 | VR4 |
|---|---|---|---|---|
| RST2 (with Vref_H) |  |  | 0 | 1 |
|  |  |  | ⊗ | ⊗ |
| RST1 (with Vref) | 0 | 0 | 1 | 1 |
|  | ⊗ | ⊗ |  |  |
| RST3 (with Vref_L) | 0 | 1 |  |  |
|  | ⇓ | ⇓ | ⇓ | ⇓ |
| VS (Validity) | 1 | 0 | 0 | 1 |

# PHYSICALLY UNCLONABLE FUNCTION CIRCUIT, AND SYSTEM AND INTEGRATED CIRCUIT INCLUDING THE SAME

CROSS-REFERENCE TO RELATED APPLICATIONS

This application claims the benefit of Korean Patent Application Nos. 10-2017-0060680, filed on May 16, 2017 and 10-2017-0117230, filed on Sep. 13, 2017, in the Korean Intellectual Property Office, the disclosures of which are incorporated herein in their entirety by reference.

BACKGROUND

The inventive concept relates to security technology, and more particularly, to a physically unclonable function (PUF) circuit.

According to the recent rapid progress in wired and wireless communication technology and smart devices-related technology, demand for establishment of security systems that allow safe usage of the technology is also increasing. Accordingly, security technology having a PUF is gaining attention. A PUF circuit refers to a circuit which is implemented in a semiconductor chip and which creates unpredictable random digital values using process deviation generated during a manufacturing process. By creating a key using a PUF circuit, duplication of an essential key such as an authentication key stored in a security device may be fundamentally prevented.

SUMMARY

The inventive concept provides a physical unclonable function (PUF) circuit with a low bit error rate (BER), and a system and an integrated circuit including the PUF circuit.

According to an aspect of the inventive concept, a physical unclonable function (PUF) is provided. The physical unclonable function (PUF) circuit includes a plurality of PUF cells each configured to generate an output voltage by dividing a power voltage, a reference voltage generator configured to generate a first reference voltage by dividing the power voltage, and a comparing unit configured to sequentially compare the output voltages of the plurality of PUF cells with the first reference voltage to output data values of the plurality of PUF cells.

According to another aspect of the inventive concept, a physical unclonable function (PUF) system is provided. The physical unclonable function (PUF) system includes a controller and a PUF circuit that comprises a plurality of PUF cells. The PUF circuit is configured to compare output voltages of the plurality of PUF cells with reference voltages to generate PUF data including data values of the plurality of PUF cells and validity data indicating validity of the data values of the plurality of PUF cells. The controller is configured to control the PUF circuit and generate a key based on the PUF data and the validity data.

According to another aspect of the inventive concept, an integrated circuit is provided. The integrated circuit has a physical unclonable function (PUF) that includes a plurality of PUF cells each configured to generate an output voltage by dividing a power voltage based on at least two resistors. The PUF also includes a reference voltage generator configured to generate a first reference voltage, a second reference voltage, and a third reference voltage by dividing the power voltage based on a resistor string. The second reference voltage is higher than the first reference voltage, and the third reference voltage is lower than the second reference voltage. The PUF further includes a comparison circuit configured to compare the output voltages of the plurality of PUF cells with each of the first reference voltage, the second reference voltage and the third reference voltage, and configured to output comparison results. In addition, the PUF includes a combinational logic configured to generate validity data indicating validity of each of the plurality of PUF cells based on the comparison results.

BRIEF DESCRIPTION OF THE DRAWINGS

Embodiments of the inventive concept will be more clearly understood from the following detailed description taken in conjunction with the accompanying drawings in which:

FIGS. 4A through 4C illustrate a validity determining method according to example embodiments;

DETAILED DESCRIPTION OF THE EMBODIMENTS

The inventive concept will now be described more fully hereinafter with reference to the accompanying drawing.

Figure 1:
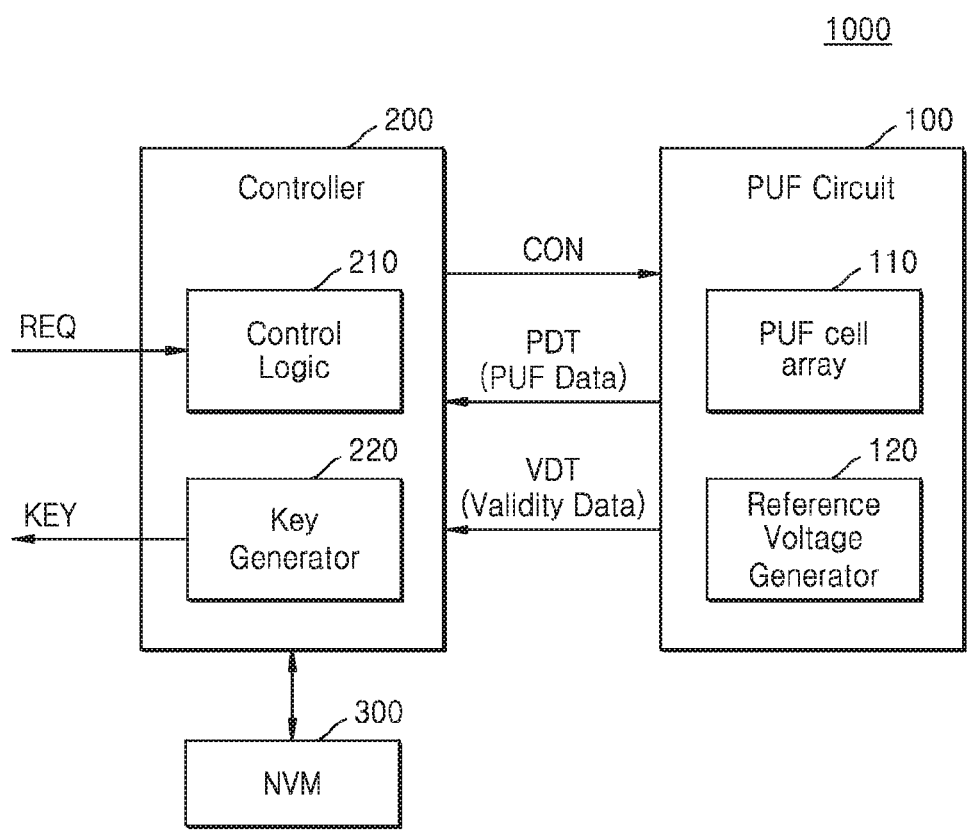
FIG. 1 is a block diagram of a physical unclonable function (PUF) system according to an example embodiment of the inventive concept.

FIG. 1 is a block diagram of a physical unclonable function (PUF) system 1000 according to an example embodiment of the inventive concept.

The PUF system 1000 may be mounted in various types of electronic devices in which encoding of data or security authentication is performed. The PUF system 1000 may generate an authentication key KEY in response to an authentication key request signal REQ from an external device such as an external processor, and provide the authentication key KEY to the external device or another external device such as an encoding module or an authentication module.

Referring to FIG. 1, the PUF system 1000 may include a PUF circuit 100, a controller 200, and a non-volatile memory 300. The PUF system 1000 may be manufactured by a semiconductor process. In example embodiments, the PUF circuit 100, the controller 200, and the non-volatile memory 300 may be formed on a single semiconductor chip or on different semiconductor chips.

The controller 200 may generate an authentication key KEY based on PUF data PDT and validity data VDT provided by the PUF circuit 100. The controller 200 may include a control logic 210 and a key generator 220.

The control logic 210 may generate a control signal CON which is used to control an operation of the PUF circuit 100. For example, the control signal CON may include a PUF cell selection signal, a reference voltage setting signal, a mode signal, a clock signal, or the like.

The key generator 220 may generate an authentication key KEY based on PUF data PDT. In an example embodiment, the key generator 220 may generate an authentication key KEY based on valid data values selected based on validity data VDT, from among data values included in PUF data PDT.

The PUF circuit 100 may generate PUF data PDT based on mismatch among resistive elements (or referred to as an error in resistance values of resistive elements), caused during a semiconductor manufacturing process. PUF data PDT has unpredictable random values in a design stage of the PUF circuit 100. In addition, the PUF data PDT has unique values based on intrinsic properties of a semiconductor chip on which the PUF circuit 100 is formed. Accordingly, even if semiconductor chips each including the PUF circuit 100 are manufactured in the same process, PUF data PDT output from a PUF circuit 100 included in a semiconductor chip may be different from PUF data PDT output from a PUF circuit 100 included in another semiconductor chip.

The PUF circuit 100 may include a PUF cell array 110 and a reference voltage generator 120.

The PUF cell array 110 may include a plurality of PUF cells, and the plurality of PUF cells may have the same structure. However, each of the plurality of PUF cells may generate an output voltage of a unique level resulting from mismatch among internal resistive elements.

The reference voltage generator 120 may generate a first reference voltage that is used in determining a data value of each of the plurality of PUF cells, and may generate a second reference voltage and a third reference voltage used in determining validity of the data value. The second reference value is higher than the first reference voltage, and the third reference voltage is lower than the first reference voltage.

For example, when an output voltage of a PUF cell is equal to or higher than the first reference voltage, the PUF circuit 100 may determine a data value of the PUF cell as logic high (digital data value of '1'). When an output voltage of a PUF cell is less than the first reference voltage, the PUF circuit 100 may determine a data value of the PUF cell as logic low (digital data value of '0'). In addition, when an output voltage of the PUF cell is equal to or higher than the second reference voltage or less than the third reference voltage, the PUF circuit 100 may determine a data value of the PUF cell to be valid. When an output voltage of the PUF cell is less than the second reference voltage and equal to or higher than the third reference voltage, the PUF circuit 100 may determine a data value of the PUF cell to be invalid. The PUF circuit 100 may generate data values of a plurality of PUF cells and validity signals indicating validity of each of the data values. The PUF circuit 100 may provide the data values and the validity signals to the controller 200 as PUF data PDT and validity data VDT, respectively.

A valid data value of a PUF cell indicates that the PUF cells is stable, and an invalid data value of a PUF cell indicates that the PUF cell is unstable. A data value of an unstable PUF cell, that is, a result of comparison between an output voltage of the unstable PUF cell and a reference voltage (e.g. the first reference voltage), is highly likely to change due to factors such as a power voltage, temperature, aging, or noise, and thus the unstable PUF cell is not used in generating an authentication key KEY. Accordingly, the key generator 220 of the controller 200 may select data values of stable PUF cells from among data values of PUF data PDT, that is, valid data values, based on validity data VDT, and may generate an authentication key KEY based on the valid data values.

Determining validity of data values, that is, generation of validity data VDT, may be performed, before generating an authentication key KEY in response to an authentication key request signal REQ. For example, determining the validity of data values may be performed in a testing process of a manufacturing process of the PUF circuit 100 or in an initialization process or a resetting process of the PUF circuit 100. The validity data VDT may be stored in the non-volatile memory 300. The non-volatile memory 300 may include one of a one-time programmable (OTP) memory, read only memory (ROM), programmable ROM (PROM), electrically programmable ROM (EPROM), an electrically erasable and programmable ROM (EEPROM), a flash memory, phase-change RAM (PRAM), magnetic RAM (MRAM), resistive RAM (RRAM), and ferroelectric RAM (FRAM). In an example embodiment, the non-volatile memory 300 may be included inside the controller 200 or the PUF circuit 100.

The controller 200 may store validity data VDT provided by the PUF circuit 100, in the non-volatile memory 300, and read the validity data VDT from the non-volatile memory 300 and use the same when generating an authentication key KEY later in response to an authentication key request signal REQ.

In an example embodiment, when generating an authentication key KEY, the controller 200 may read validity data VDT from the non-volatile memory 300, and receive PUF data PDT from the PUF circuit 100. The controller 200 may select valid data values from among the PUF data PDT based on the validity data VDT, and generate an authentication key KEY based on the valid data values.

In another example embodiment, when generating an authentication key KEY, the controller 200 may select valid PUF cells based on validity data VDT, and the PUF circuit 100 may generate PUF data PDT including data values of only valid PUF cells and provide the same to the controller 200. The controller 200 may generate an authentication key KEY based on the received PUF data PDT. In an example embodiment, the controller 200 may output PUF data PDT as an authentication key KEY.

Figure 2:
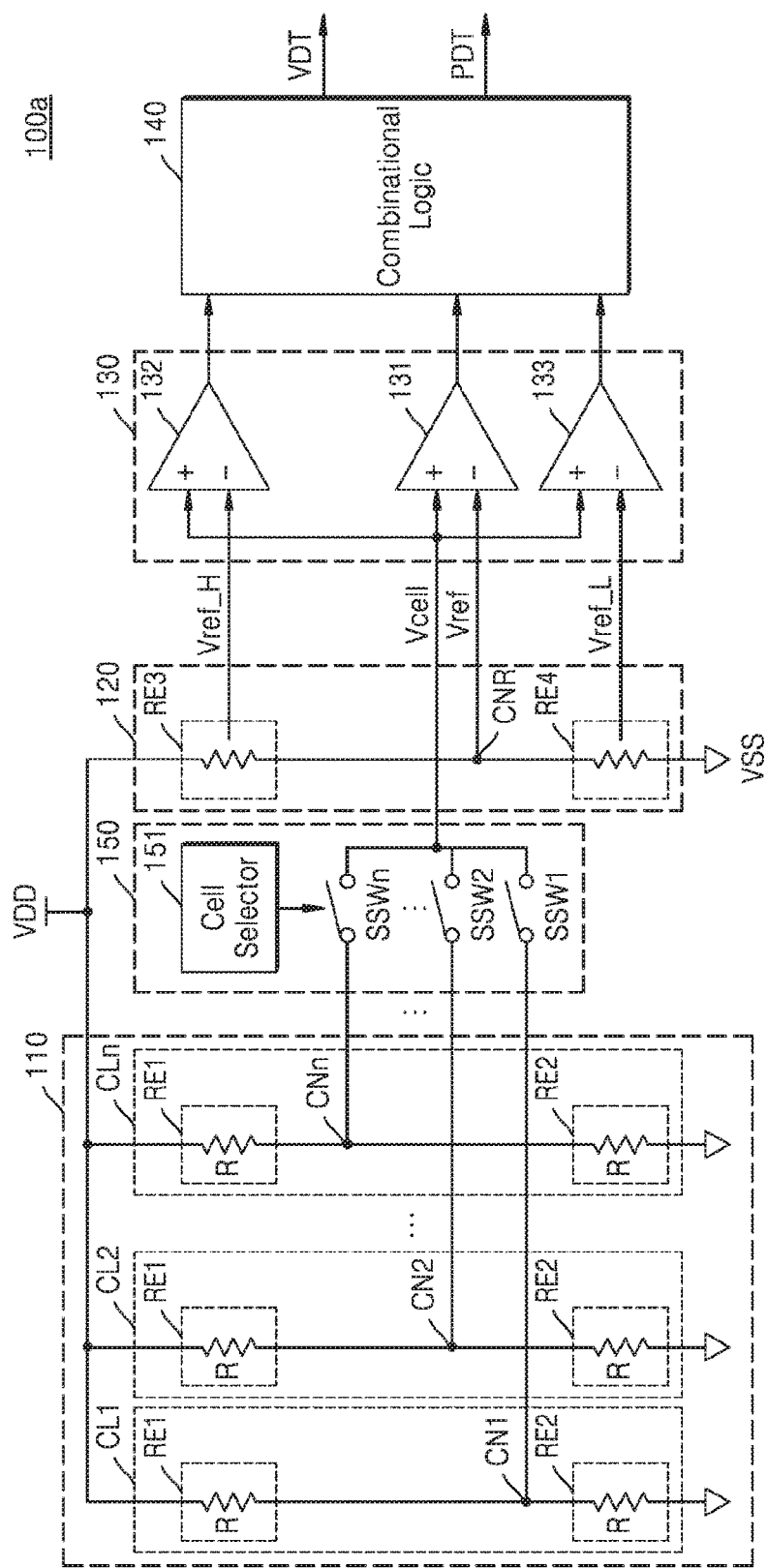
FIG. 2 is a circuit diagram of a PUF circuit according to an example embodiment of the inventive concept.
Figure 3A:
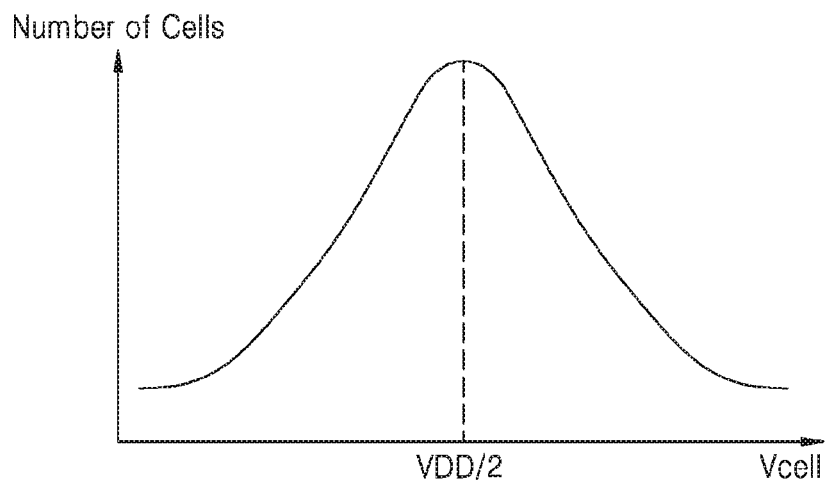
FIG. 3A illustrates a distribution of a plurality of PUF cells.
Figure 3B:
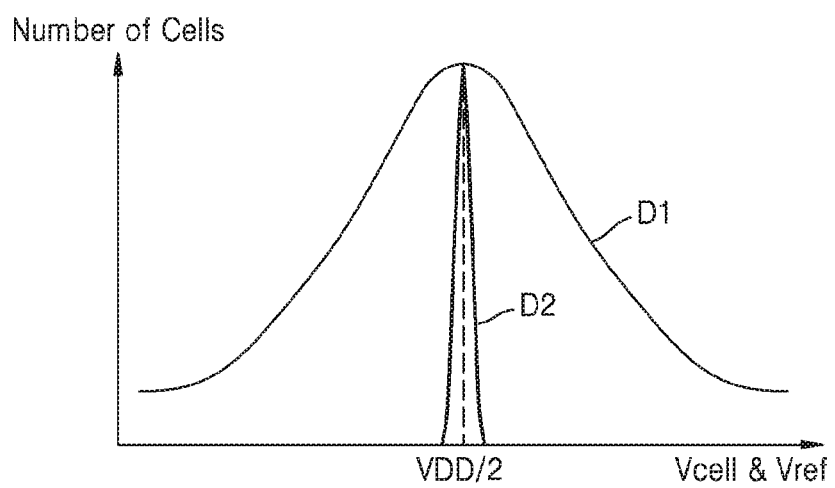
FIG. 3B illustrates a distribution of a first reference voltage.
Figure 3C:
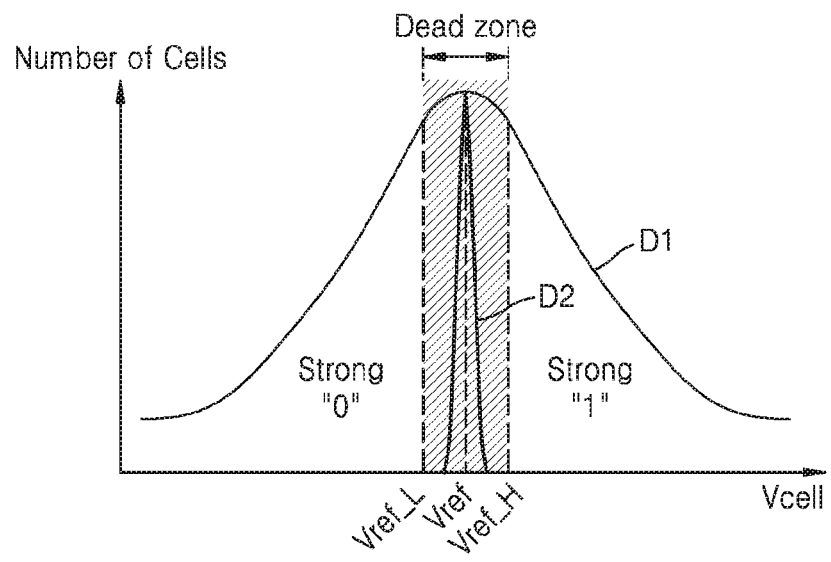
FIG. 3C is a view for explaining a dead zone according to a second reference voltage and a third reference voltage.

FIG. 2 is a circuit diagram of a PUF circuit 100a according to an example embodiment of the inventive concept. FIG. 3A illustrates a distribution of output voltages of a plurality of PUF cells. FIG. 3B illustrates a distribution of a first reference voltage. FIG. 3C is a view for explaining a dead zone according to a second reference voltage and a third reference voltage.

Referring to FIG. 2, the PUF circuit 100a may include a PUF cell array 110, a reference voltage generator 120, a comparison circuit 130, a combinational logic 140, and a cell selection circuit 150.

The PUF cell array 110 may include a plurality of PUF cells CL1 through CLn, and each of the plurality of PUF cells CL1 through CLn may divide a power voltage VDD using resistive elements RE1 and RE2 so as to generate an output voltage.

For example, in the case of a first PUF cell CL1, the first PUF cell CL1 may include a first resistive element RE1 and a second resistive element RE2. The first resistive element RE1 and the second resistive element RE2 may be homogeneous resistive elements. For example, the first resistive element RE1 and the second resistive element RE2 may be a resistor or a resistor string in which a plurality of resistors are serially connected, and the resistor may be a via, a metal wiring, polysilicon, or the like. In addition, the resistor may be any type of resistor that may be implemented in a manufacturing process. However, the resistor is not limited thereto, and the first resistive element RE1 and the second resistive element RE2 may also be various resistive elements such as a switched capacitor or a magnetic resistive element.

The first resistive element RE1 and the second resistive element RE2 may be serially connected, and a power voltage VDD may be applied to an end of the first resistive element RE1. An output voltage of the first PUF cell CL1 may be output from a connection node CN1 between the first resistive element RE1 and the second resistive element RE2. Accordingly, the first resistive element RE1 and the second resistive element RE2 may operate as a voltage divider.

According to an example embodiment, the first resistive element RE1 and the second resistive element RE2 may have identical resistance values. In detail, target resistance values of the first resistive element RE1 and the second resistive element RE2 may be identical. Accordingly, an output voltage of the first PUF cell CL1 may be half of the power voltage VDD. However, a difference between resistance values of the first resistive element RE1 and the second resistive element RE2 may be generated due to mismatch occurring during a semiconductor manufacturing process, and the difference in the resistances may be shown as an error in an output voltage of the first PUF cell CL1.

A data value of the first PUF cell CL1 may be determined based on the output voltage of the first PUF cell CL1, that is, an error in the output voltage of the first PUF cell CL1. The greater the error in the output voltage, the more stable a data value of the first PUF cell CL1 may be maintained. Accordingly, in order to increase mismatch between the first resistive element RE1 and the second resistive element RE2, the first resistive element RE1 and the second resistive element RE2 may be designed to have a very small length and width.

As the first resistive element RE1 and the second resistive element RE2 are homogeneous resistive elements, a variation in a resistance value of each of the first resistive element RE1 and the second resistive element RE2 according to a change in, for example, temperature, voltage, test conditions or a change in the environment such as aging may show the same tendency. For example, an increase in a resistance value of the first resistive element RE1 according to a temperature increase may be similar to an increase in a resistance value of the second resistive element RE2. Thus, even when the environment changes, an output voltage of the first PUF cell CL1 may be maintained relatively uniform.

A configuration and structure of other PUF cells CL2 through CLn are identical to those of the first PUF cell CL1. Thus, repeated description will be omitted. Output voltages may be output from connection nodes CN2 through CNn of the first resistive element RE1 and the second resistive element RE2 included in each of the other PUF cells CL2 through CLn. However, a degree of mismatch of the first resistive element RE1 and the second resistive element RE2 of each of the plurality of PUF cells CL1 through CLn is random, and accordingly, output voltages of the plurality of PUF cells CL1 through CLn may be different from each other. A distribution of the output voltages of the plurality of PUF cells CL1 through CLn may be as illustrated in FIG. 3A.

Referring to FIG. 3A, a horizontal axis denotes an output voltage Vcell of a PUF cell, and a vertical axis denotes the number of PUF cells corresponding to each output voltage Vcell. As illustrated in FIG. 3A, most PUF cells may have an output voltage Vcell corresponding to half of a power voltage VDD (VDD/2) or adjacent to VDD/2, and the output voltages of the plurality of PUF cells CL1 through CLn may have a normal distribution.

Referring to FIG. 2 again, the cell selection circuit 150 may select and output one of the output voltages of the plurality of PUF cells CL1 through CLn, and may sequentially select and output the output voltages of the plurality of PUF cells CL1 through CLn.

The cell selection circuit 150 may include a plurality of cell selection switches SSW1 through SSWn respectively connected to the plurality of PUF cells CL1 through CLn and a cell selector 151.

The cell selector 151 may control turning on and off the plurality of cell selection switches SSW1 through SSWn. For example, the cell selector 151 may generate on-off control signals respectively corresponding to the plurality of cell selection switches SSW1 through SSWn, and provide the same to each of the plurality of cell selection switches SSW1 through SSWn. The cell selector 151 may turn on one of the plurality of cell selection switches SSW1 through SSWn, and turn off the other cell selection switches.

In an example embodiment, the cell selector 151 may sequentially turn on the plurality of cell selection switches SSW1 through SSWn in synchronization with a clock signal. Accordingly, output voltages of the PUF cell CL1 through CLn may be sequentially output.

In another example embodiment, the cell selector 151 may sequentially turn on some cell selection switches selected from among the plurality of cell selection switches SSW1 through SSWn, based on a control signal CON provided from the outside, for example, from the controller 200 as shown in FIG. 1. Output voltages of those PUF cells selected from among the plurality of PUF cells CL1 through CLn may be sequentially output to the comparison circuit 130.

The reference voltage generator 120 may divide the power voltage VDD using third and fourth resistive elements RE3 and RE4 to generate reference voltages, that is, a first reference voltage Vref, a second reference voltage Vref_H, and a third reference voltage Vref_L. As described above with reference to FIG. 1, the first reference voltage Vref is used to determine a data value of each of the plurality of PUF cells CL1 through CLn, and the second reference voltage Vref_H and the third reference voltage Vref_L are used to determine validity of the data values of the plurality of PUF cells CL1 through CLn.

The reference voltage generator 120 may include a third resistive element RE3 and a fourth resistive element RE4. The third resistive element RE3 and the fourth resistive element RE4 may be homogeneous resistive elements, and may be homogeneous or heterogeneous to the first resistive element RE1 and the second resistive element RE2. For example, the third resistive element RE3 and the fourth resistive element RE4 may be resistor strings.

The third resistive element RE3 and the fourth resistive element RE4 may be serially connected, and the power voltage VDD may be applied to an end of the third resistive element RE3. The third resistive element RE3 and the fourth resistive element RE4 may operate as voltage dividers. A first reference voltage Vref may be output from a connection node CNR between the third resistive element RE3 and the fourth resistive element RE4.

In an example embodiment, resistance values of the third resistive element RE3 and the fourth resistive element RE4 may be identical. In detail, target resistance values of the third resistive element RE3 and the fourth resistive element RE4 may be identical. Accordingly, the first reference voltage Vref may be half of the power voltage VDD. However, a difference between resistance values of the third resistive element RE3 and the fourth resistive element RE4 may be generated due to mismatch occurring in a semiconductor manufacturing process, and the difference in the resistances may be shown as an error in the first reference voltage Vref.

The first reference voltage Vref is a reference voltage for determining a data value of the plurality of PUF cells CL1 through CLn, and thus should have little error. Thus, in order to reduce mismatch between the third resistive element RE3 and the fourth resistive element RE4, the third resistive element RE3 and the fourth resistive element RE4 may be designed to have a long length and a wide width. For example, the third resistive element RE3 and the fourth resistive element RE4 may be designed to have greater lengths and wider widths than the first resistive element RE1 and the second resistive element RE2.

A distribution of the first reference voltage Vref may be as illustrated in FIG. 3B. In FIG. 3B, a distribution D2 of the first reference voltage Vref shows a distribution of first reference voltages respectively output from PUF circuits implemented on different semiconductor chips, and may follow a normal distribution.

Referring to FIG. 3B, the distribution D2 of the first reference voltage Vref may have significantly small variation compared to a distribution D1 of output voltages of the plurality of PUF cells CL1 through CLn. Data values of the plurality of PUF cells CL1 through CLn may be determined by comparing the output voltages of the plurality of PUF cells CL1 through CLn and the first reference voltage Vref. For example, a data value of a PUF cell having an output voltage that is equal to or higher than the first reference voltage Vref may be determined as logic high (digital data value of '1'), and a data value of a PUF cell having an output voltage that is less than the first reference voltage Vref may be determined as logic low (digital data value of '0').

Referring to FIG. 2 again, the reference voltage generator 120 may further output the second reference voltage Vref_H and the third reference voltage Vref_L. As described above, the third resistive element RE3 and the fourth resistive element RE4 may be formed of resistor strings including a plurality of resistors, and the second reference voltage Vref_H may be output from one of a plurality of nodes of the third resistive element RE3, and the third reference voltage Vref_L may be output from one of a plurality of nodes of the fourth resistive element RE4. Accordingly, the second reference voltage Vref_H is higher than the first reference voltage Vref, and the third reference voltage Vref_L is lower than the first reference voltage Vref.

Referring to FIG. 3C, a voltage range between the second reference voltage Vref_H and the third reference voltage Vref_L may be set as a dead zone. A PUF cell having an output voltage in the dead zone, from among the plurality of PUF cells CL1 through CLn, may be determined to be unstable, and a data value of the PUF cell may be determined to be invalid. The second reference voltage Vref_H and the third reference voltage Vref_L may be set by considering the distribution D2 of the first reference voltage Vref, offsets of comparators (e. g., first through third comparators 131, 132, and 133) and noise effect.

Whether an output voltage of a PUF cell is located in the dead zone, that is, validity of a data value of the PUF cell, may be determined using the comparison circuit 130 and the combinational logic 140.

The comparison circuit 130 may compare output voltages of the plurality of PUF cells CL1 through CLn with the first through third reference voltages Vref, Vref_H, and Vref_L, and output a comparison result. The comparison circuit 130 may sequentially output comparison results regarding the plurality of PUF cells CL1 through CLn by comparing an output voltage Vcell of a PUF cell output from the cell selection circuit 150 with the first through third reference voltages Vref, Vref_H, and Vref_L.

The comparison circuit 130 may include first through third comparators 131, 132, and 133. The first comparator 131 may compare an output voltage Vcell of a PUF cell with the first reference voltage Vref, and output a comparison result (hereinafter referred to as a first comparison result). For example, if an output voltage Vcell of a PUF cell is equal to or higher than the first reference voltage Vref, '1' may be output, and if an output voltage Vcell of a PUF cell is less than the first reference voltage Vref, '0' may be output. However, the comparison result is not limited thereto, and an opposite result may also be output. The comparison result may be output as a data value of the PUF cell.

The second comparator 132 may compare an output voltage Vcell of a PUF cell with the second reference voltage Vref_H, and output a comparison result (hereinafter referred to as a second comparison result). For example, if an output voltage Vcell of a PUF cell is equal to or higher than the second reference voltage Vref_H, '1' may be output, and if an output voltage Vcell of a PUF cell is less than the second reference voltage Vref_H, '0' may be output. Alternatively, an opposite result may be output.

The third comparator 133 may compare an output voltage Vcell of a PUF cell with the third reference voltage Vref_L, and output a comparison result (hereinafter referred to as a third comparison result). For example, if an output voltage Vcell of a PUF cell is equal to or higher than the third reference voltage Vref_L, '1' may be output, and if an output voltage Vcell of a PUF cell is less than the third reference voltage Vref_L, '0' may be output. Alternatively, an opposite result may be output.

The comparison circuit 130 may provide the first through third comparison results regarding each of the plurality of PUF cells CL1 through CLn to the combinational logic 140.

Meanwhile, while the comparison circuit 130 is illustrated in FIG. 2 to include three comparators, for example, the first through third comparators 131, 132, and 133, the comparison circuit 130 is not limited thereto. The comparison circuit 130 may include one or two comparators, and the one or two comparators may compare an output voltage Vcell of a PUF cell with the first through third reference voltages Vref, Vref_H, and Vref_L in a time sharing manner.

The combinational logic 140 may be formed of a plurality of logic gates, and may generate PUF data PDT based on a first comparison result regarding each of the plurality of PUF cells CL1 through CLn, that is, data values of the plurality of PUF cells CL1 through CLn. In addition, the combinational logic 140 may generate a validity signal indicating validity of a data value of a PUF cell, that is, stability (or validity) of the PUF cell, based on at least two of first through third comparison results. The combinational logic 140 may output validity signals of the plurality of PUF cells CL1 through CLn as validity data PDT. The combinational logic 140 may be referred to as a validity determining logic.

The combinational logic 140 may determine whether an output voltage of a PUF cell is in a dead zone based on at least two of the first through third comparison results, and generate a validity signal of a PUF cell having an output voltage in a dead zone as '0', and a validity signal of a PUF cell having an output voltage outside the dead zone as '1'. The validity determining method of the combinational logic 140 will be described below with reference to FIGS. 4A through 4C.

As described above, the PUF circuit 100a according to the example embodiment of the inventive concept may generate PUF data PDT by comparing output voltages of the plurality of PUF cells CL1 through CLn, which are generated by dividing a power voltage VDD using resistive elements, with the first reference voltage Vref. As changes in, for example, temperature, voltage, test conditions or a change in the environment such as aging regarding the resistive elements used in dividing of the power voltage VDD are identical, the output voltages of the plurality of PUF cells CL1 through CLn and the first reference voltage Vref may be maintained relatively uniform regardless of environmental changes. Thus, the number of unstable PUF cells may be small.

In addition, in order to screen unstable PUF cells and select stable PUF cells (or valid data values), the PUF circuit 100a may generate the second reference voltage Vref_H and the third reference voltage Vref_L, and set a dead zone based on them. A bit error rate (BER) of the PUF circuit 100a may be reduced by screening potentially unstable PUF cells having the possibility of generating unstable data values and by using data values of strong PUF cells having a sufficient margin. For example, if a difference among the first reference voltage Vref, the second reference voltage Vref_H and the third reference voltage Vref_L, that is, a margin, is set to be broad, the PUF circuit 100a may reach a zero BER.

When a PUF circuit has a high BER, a complicated error checking and correction (ECC) logic is required to perform ECC, and more PUF cells than the number of actually needed bits of an authentication key are required. Accordingly, the PUF circuit (or a system in which the PUF circuit is mounted) has a large area and higher power consumption.

However, according to the example embodiment of the inventive concept, by setting a dead zone based on the second reference voltage Vref_H and the third reference voltage Vref_L and by screening unstable PUF cells having an output voltage in a dead zone, a BER may be lowered to omit an ECC logic or a simple ECC logic may be used. Thus, the area of a PUF system including the PUF circuit 100a (for example, the PUF system 1000 of FIG. 1) may be reduced and power consumption may also be reduced. In addition, in order to determine unstable PUF cells, there is no need to test PUF cells by modifying various conditions, for example, a voltage level of a power voltage VDD or a temperature, and thus, a test procedure may be simplified. Thus, a test period and costs for tests may be reduced.

Figure 4A:
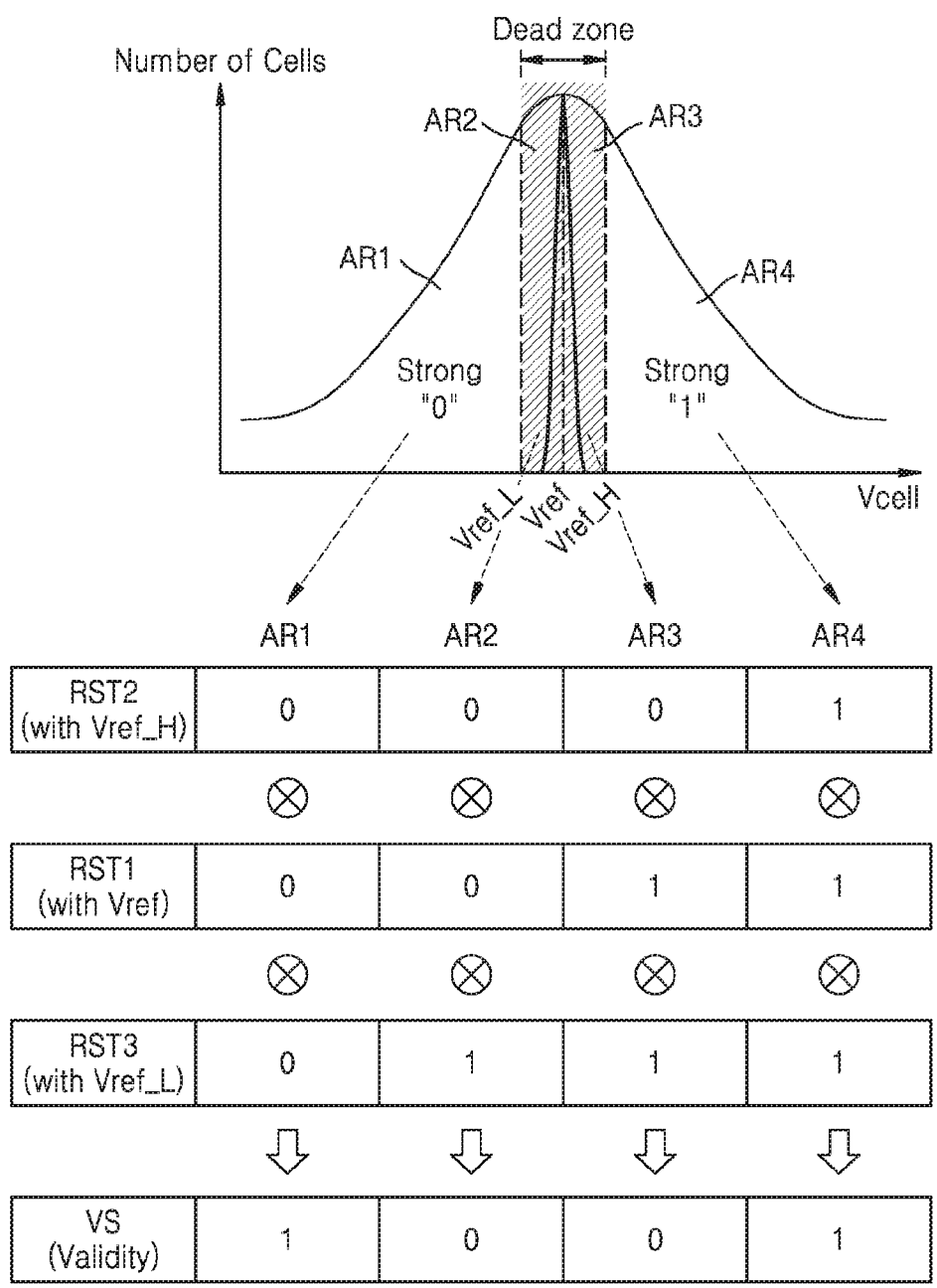

FIGS. 4A through 4C illustrate a validity determining method according to example embodiments. The combinational logic 140 of FIG. 2 may determine validity of a plurality of PUF cells or of data values of the plurality of PUF cells, and generate a validity signal based on the validity determining method.

Referring to FIG. 4A, a distribution of an output voltage of a plurality of PUF cells may be divided into first through fourth areas AR1 through AR4. The first area AR1 is a voltage range less than the third reference voltage Vref_L. The second area AR2 is a voltage range equal to or higher than the third reference voltage Vref_L, and less than the first reference voltage Vref. The third area AR3 is a voltage range equal to or higher than the first reference voltage Vref, and less than the second reference voltage Vref_H. The fourth area AR4 is a voltage range equal to or higher than the second reference voltage Vref_H.

The combinational logic 140 may perform a logical operation on a first comparison result RST1, a second comparison result RST2, and a third comparison result RST3 to generate a validity signal VS regarding a PUF cell. Here, the first comparison result RST1, the second comparison result RST2, and the third comparison result RST3 are results of comparing an output voltage of a PUF cell with each of the first reference voltage Vref, the second reference voltage Vref_H, and the third reference voltage Vref_L. The first comparison result RST1 may indicate a data value of the PUF cell.

A first comparison result RST1, a second comparison result RST2, and a third comparison result RST3 of a PUF cell having an output voltage in the first area AR1 may all be '0'. A first comparison result RST1 and a second comparison result RST2 of a PUF cell having an output voltage in the second area AR2 may be '0', and a third comparison result RST3 of the PUF cell may be '1'. A first comparison result RST1 and a third comparison result RST3 of a PUF cell having an output voltage in the third area AR3 may be '1', and a second comparison result RST2 of the PUF cell may be '0'. A first comparison result RST1, a second comparison result RST2, and a third comparison result RST3 of a PUF cell having an output voltage in the fourth area AR4 may all be '1'.

According to the logical operation performed on the first comparison result RST1, the second comparison result RST2, and the third comparison result RST3, a validity signal VS of a PUF cell having an output voltage in the first area AR1 or the fourth area AR4 may be generated as '1', and a validity signal VS of a PUF cell having an output voltage in the second area AR2 or the third area AR3 may be generated as '0'. Accordingly, the PUF cell having an output voltage in the first area AR1 or the fourth area AR4 may be determined to be valid (or stable). A PUF cell having an output voltage in the first area AR1 may have a data value of a strong '0', and a PUF cell having an output voltage in the fourth area AR4 may have a data value of a strong '1'.

For example, when PUF data PDT and validity data VDT regarding first through fourth PUF cells are generated, and the first through fourth PUF cells are respectively in the first through fourth areas AR1 through AR4, the validity data VDT may be generated as '1001', and the PUF data PDT may be generated as '0011'. As the first through fourth PUF cells may be determined to be valid based on the validity data VDT, a PUF data value '01' of the first and fourth PUF cells from among the PUF data PDT may be used when generating an authentication key.

Referring to FIG. 4B, the combinational logic 140 may perform an logical operation on a second comparison result RST2 and a third comparison result RST3 of a PUF cell to generate a validity signal VS regarding the PUF cell. Accordingly, a validity signal VS of a PUF cell having an output voltage in the first area AR1 or the fourth area AR4 may be generated as '1', and a validity signal VS of a PUF cell having an output voltage in the second area AR2 or the third area AR3 may be generated as '0'.

Referring to FIG. 4C, the combinational logic 140 may perform an logical operation on a first comparison result RST1, and one of a second comparison result RST2 and a third comparison result RST3 of a PUF cell to generate a validity signal VS regarding the PUF cell. For example, when the first comparison result RST1 is '0', the combinational logic 140 may perform an exclusive NOR operation on the first comparison result RST1 and the third comparison result RST3 to generate a validity signal VS. When the first comparison result RST1 is '1', the combinational logic 140 may perform an exclusive NOR operation on the first comparison result RST1 and the second comparison result RST2 to generate a validity signal VS. Accordingly, a validity signal VS of a PUF cell having an output voltage in the first area AR1 or the fourth area AR4 may be generated as '1', and a validity signal VS of a PUF cell having an output voltage in the second area AR2 or the third area AR3 may be generated as '0'.

The combinational logic 140 may determine validity of a plurality of PUF cells according to the example embodiments described above with reference to FIGS. 4A through 4C. However, these are merely example embodiments, and the validity determining method may be modified.

Figure 5:
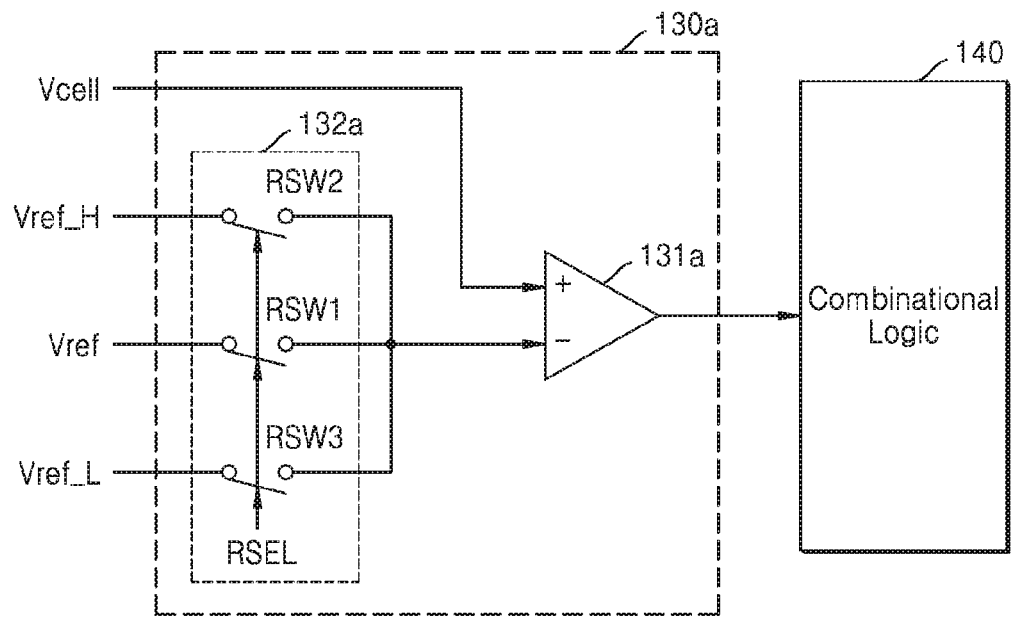
FIG. 5 illustrates an example of a comparison circuit according to an example embodiment of the inventive concept.

FIG. 5 illustrates an example of a comparison circuit 130a according to an example embodiment of the inventive concept. The comparison circuit 130a may be applied to the PUF circuit 100a of FIG. 2 as a comparison circuit.

Referring to FIG. 5, the comparison circuit 130a may include a comparator 131a and a switching circuit 132a. The switching circuit 132a may include first through third reference switches RSW1, RSW2, and RSW3. A first end of each of the first through third reference switches RSW1, RSW2, and RSW3 may be connected to a first end of the comparator 131a. Second ends of the first through third reference switches RSW1, RSW2, and RSW3 may be connected to first through third reference voltages Vref, Vref_H, and Vref_L, respectively.

In response to a reference selection signal RSEL, one of the first through third reference switches RSW1, RSW2, and RSW3 may be turned on, and one of the first through third reference voltages Vref, Vref_H, and Vref_L may be provided to the first end of the comparator 131a. The reference selection signal RSEL may be provided from, for example, the control logic 210 of the controller 200 as shown in FIG. 1.

The comparator 131a may receive an output voltage Vcell of a PUF cell and an output of the switching circuit 132a, and compare them to output a comparison result. The comparator 131a may provide the combinational logic 140 with a first comparison result, a second comparison result, and a third comparison result according to comparison of the output voltage Vcell of the PUF cell with the first reference voltage Vref, the second reference voltage Vref_H, and the third reference voltage Vref_L.

In an example embodiment, when generating validity data, the first through third reference switches RSW1, RSW2, and RSW3 may be sequentially turned on in response to a reference selection signal RSEL, and accordingly, the first through third reference voltages Vref, Vref_H, and Vref_L may be sequentially provided to the comparator 131a. The comparator 131a may sequentially provide the first through third comparison results to the combinational logic 140. When generating an authentication key KEY, that is, when generating PUF data, the first reference switch RSW1 may be turned on in response to a reference selection signal REL to provide the first reference voltage Vref to the comparator 131a, and the comparator 131a may provide the first comparison result to the combinational logic 140.

In another example embodiment, when generating validity data, the second and third reference switches RSW2 and RSW3 may be alternately turned on in response to a reference selection signal, and accordingly, the second and third reference voltages Vref_H and Vref_L may be alternately provided to the comparator 131a. The comparator 131a may alternately provide the first through third comparison results to the combinational logic 140. When generating a key Key, that is, when generating PUF data, the first reference switch RSW1 may be turned on in response to a reference selection signal REL to provide the first reference voltage Vref to the comparator 131a, and the comparator 131a may provide the first comparison result to the combinational logic 140.

Figure 6:
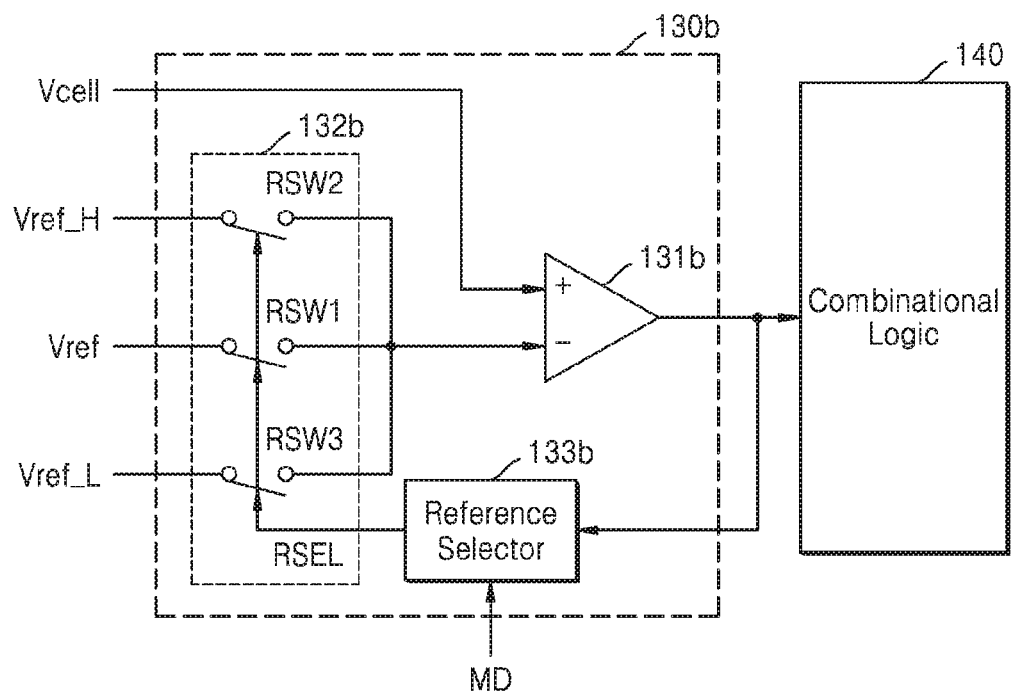
FIG. 6 illustrates an example of a comparison circuit according to an example embodiment of the inventive concept.

FIG. 6 illustrates an example of a comparison circuit 130b according to an example embodiment of the inventive concept. The comparison circuit 130b may be applied to the PUF circuit 100a of FIG. 2 as a comparison circuit.

A configuration and an operation of the comparison circuit 130b of FIG. 6 are similar to those of the comparison circuit 130a of FIG. 5. However, the comparison circuit 130b of FIG. 6 may further include a reference selector 133b.

The reference selector 133b may generate a reference selection signal RSEL that controls turning on and off of first through third reference switches RSW1, RSW2, and RSW3. In an example embodiment, the reference selector 133b may generate a reference selection signal RSEL in response to a mode signal MD. For example, the mode signal MD may indicate a validity data generation mode or a PUF data generation mode, and may be provided by the control logic 210 of the controller 200 as shown in FIG. 1.

When a mode signal MD indicates a validity data generation mode, the reference selector 133b may generate a reference selection signal RSEL that sequentially turns on the first through third reference switches SW1, SW2, and SW3 or alternately turns on the second and third switches RSW2 and RSW3. In addition, when a mode signal MD indicates a PUF data generation mode, the reference selector 133b may generate a reference selection signal RSEL that turns on the first reference switch RSW1.

In an example embodiment, when a mode signal MD indicates a validity data generation mode, the reference selector 133b may generate a reference selection signal RSEL based on an output of the comparator 131b. The reference selector 133b may generate a reference selection signal RSEL that turns on the first reference switch RSW1, and then generate a reference selection signal RSEL that turns on one of the second and third reference switches RSW2 and RSW3 based on an output of the comparator 131b, for example, a first comparison result. For example, when a first comparison result is '1', the third reference switch RSW3 may be turned on, and when a first comparison result is '0', the second reference switch RSW2 may be turned on. Accordingly, when a first comparison result is '1', the comparator 131*b* may provide the combinational logic 140 with the first comparison result and a third comparison result to the combinational logic 140, and when a first comparison result is '0', the comparator 131*b* may provide the combinational logic 140 with the first comparison result and a second comparison result.

The combinational logic 140 may determine validity of a PUF cell with the validity determining method described with reference to FIG. 4C, based on the received first and second comparison results or based on the received first and third comparison results.

Figure 7:
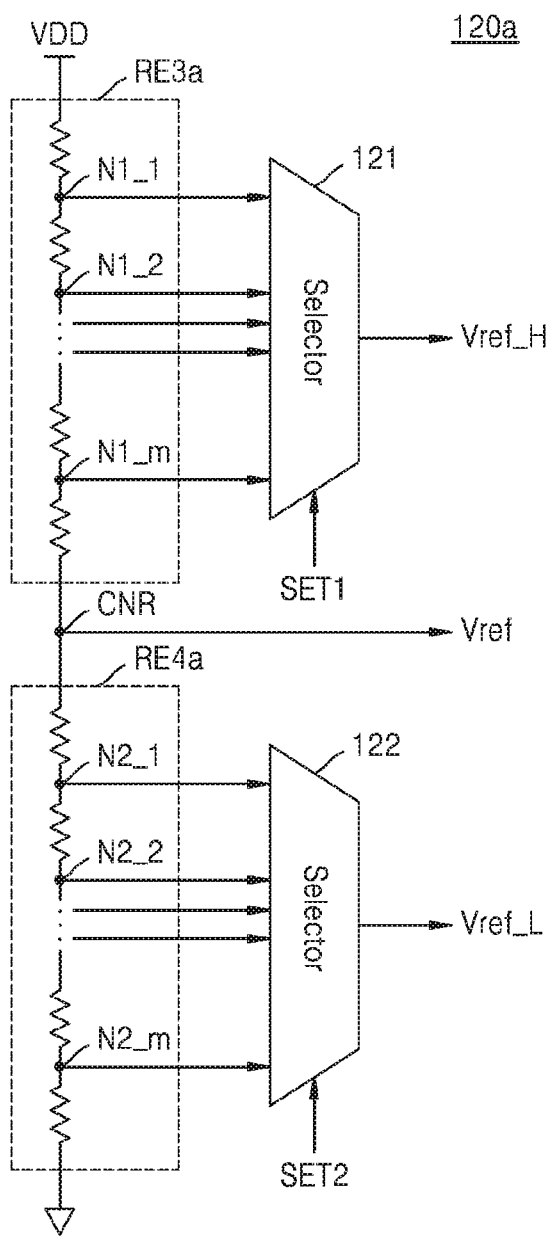
FIG. 7 is an example of a reference voltage generator according to an example embodiment of the inventive concept.

FIG. 7 is an example of a reference voltage generator 120*a* according to an example embodiment of the inventive concept. The reference voltage generator 120*a* is an example of the reference voltage generator 120 described with reference to FIG. 2. Thus, description of the reference voltage generator 120 of FIG. 2 may apply to the reference voltage generator 120*a* of the example embodiment.

Referring to FIG. 7, the reference voltage generator 120*a* may include a third resistive element RE3*a*, a fourth resistive element RE4*a*, a first selector 121, and a second selector 122.

The third resistive element RE3*a* and the fourth resistive element RE4*a* may be each formed of a resistor string including a plurality of resistors. The third resistive element RE3*a* and the fourth resistive element RE4*a* may divide a power voltage VDD and output divided voltages.

A voltage of a connection node CNR between the third resistive element RE3*a* and the fourth resistive element RE4*a* may be output as a first reference voltage Vref. Resistance values of the third resistive element RE3*a* and the fourth resistive element RE4*a*, for example, target resistance values, may be identical, and the first reference voltage Vref may be similar to half of the power voltage VDD.

Meanwhile, a plurality of divided voltages may be output from the third resistive element RE3*a*, that is, a plurality of nodes N1_1 through N1_*m* of the resistor string, and the first selector 121 may select one of the plurality of divided voltages as a second reference voltage Vref_H based on a first setting signal SET1.

A plurality of divided voltages may be output from the fourth resistive element RE4*a*, that is, a plurality of nodes N2_1 through N2_*m* of the resistor string, and the second selector 122 may select one of the plurality of divided voltages as a third reference voltage Vref_L based on a second setting signal SET2.

The first setting signal SET1 and the second setting signal SET2 may be provided from the controller 200 as shown in FIG. 1, and may be varied. The first setting signal SET1 and the second setting signal SET2 may be set by considering a distribution of the first reference voltage Vref, offsets of one or more comparators (e.g. each of the first through third comparators 131, 132, and 133 of FIG. 2, the comparator 131*a* of FIG. 5 and the comparator 131*b* of FIG. 6), and noise. For example, as the distribution of the first reference voltage Vref becomes larger, the first selection signal SET1 may be set such that a divided voltage of a relatively high level is selected, and the second selection signal SET2 may be set such that a divided voltage of a relatively low level is selected.

Figure 8:
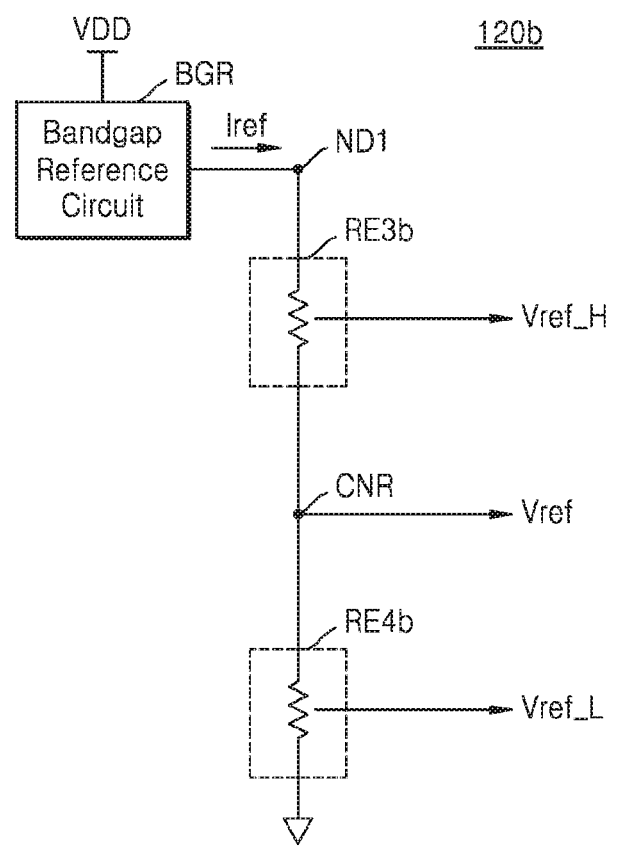
FIG. 8 is an example of a reference voltage generator according to an example embodiment of the inventive concept.

FIG. 8 is an example of a reference voltage generator 120*b* according to an example embodiment of the inventive concept. The reference voltage generator 120*b* is an example of the reference voltage generator 120 described with reference to FIG. 2. Thus, description of the reference voltage generator 120 of FIG. 2 may apply to the reference voltage generator 120*b* of the example embodiment.

Referring to FIG. 8, the reference voltage generator 120*b* may include a bandgap reference circuit BGR, a third resistive element RE3*b*, and a fourth resistive element RE4*b*.

The bandgap reference circuit BGR may output a reference current Iref of a constant level regardless of a change in temperature, voltage or the like. The reference current Iref may flow through the third resistive element RE3*b* and the fourth resistive element RE4*b*, and an amount of the reference current Iref may be set such that a first end ND1 of the third resistive element RE3*b* is at a level of a power voltage VDD. The third resistive element RE3*b* and the fourth resistive element RE4*b*, and generation of first through third reference voltages Vref, Vref_H, and Vref_L are the same as described with reference to FIGS. 2 and 7, and thus repeated description will be omitted.

Figure 9:
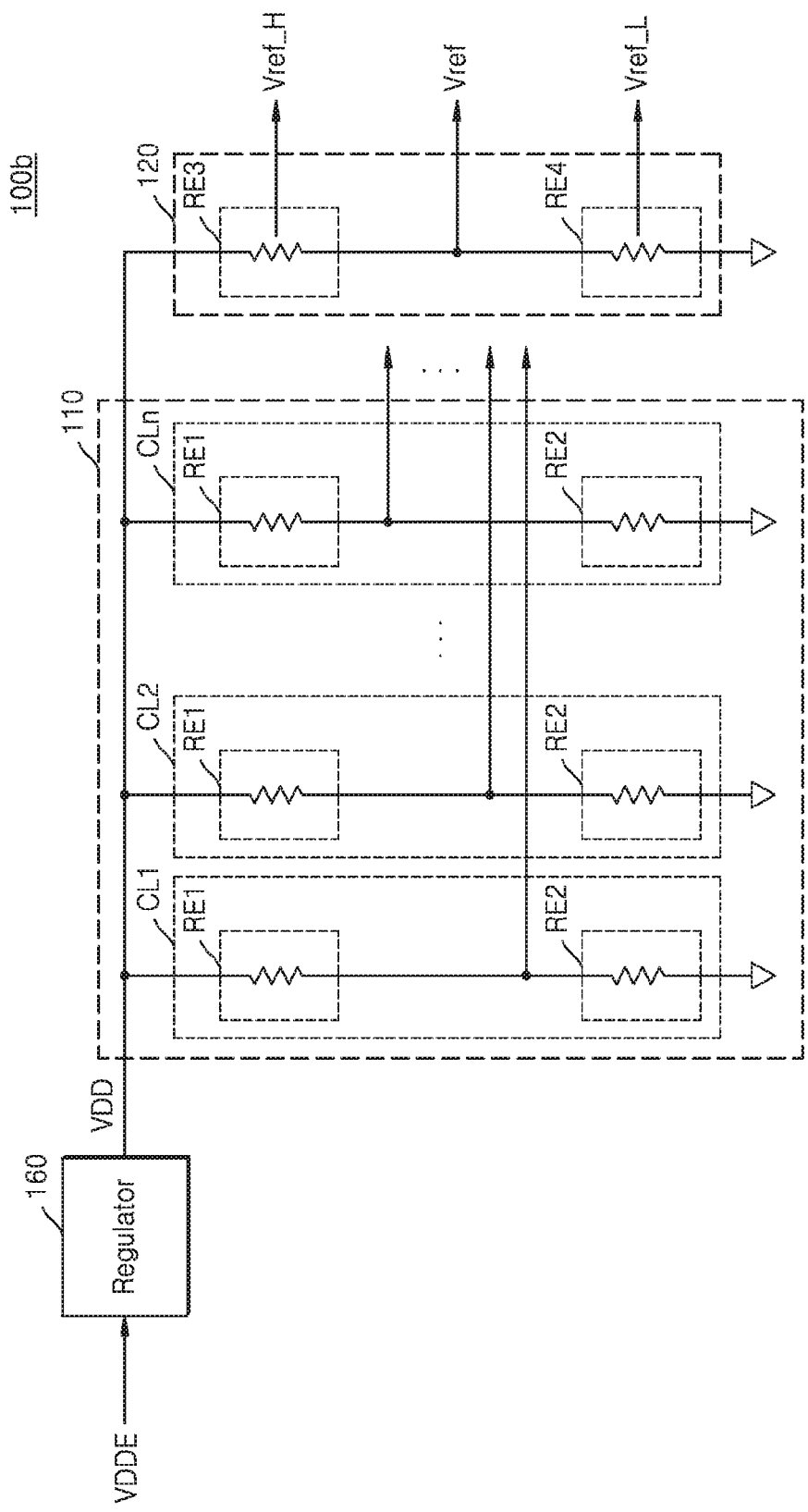
FIG. 9 is a circuit diagram of a PUF circuit according to an example embodiment of the inventive concept.

FIG. 9 is a circuit diagram of a PUF circuit 100*b* according to an example embodiment of the inventive concept.

The PUF circuit 100*b* of FIG. 9 may include a PUF cell array 110, a reference voltage generator 120, and a regulator 160. Although not illustrated, the PUF circuit 100*b* may further include other configurations of the PUF circuit 100*a* described with reference to FIG. 2.

A configuration and an operation of the PUF circuit 100*b* are the same as those of the PUF circuit 100*a* of FIG. 2. However, the PUF circuit 100*b* may further include the regulator 160, and receive a power voltage VDD through the regulator 160.

The regulator 160 may generate a power voltage VDD to be provided to the PUF cell array 110 and the reference voltage generator 120 based on an external power voltage VDDE received from the outside. The regulator 160 may generate a power voltage VDD of a constant level despite a change in a level of the external power voltage VDDE. A plurality of PUF cells CL1 through CLn of the PUF cell array 110 and the reference voltage generator 120 may respectively generate output voltages of a constant level and first through third reference voltages Vref, Vref_H, and Vref_L regardless of a change in the external power voltage VDDE. Thus, data values of the plurality of PUF cells CL1 through CLn may be maintained uniform.

Figure 10:
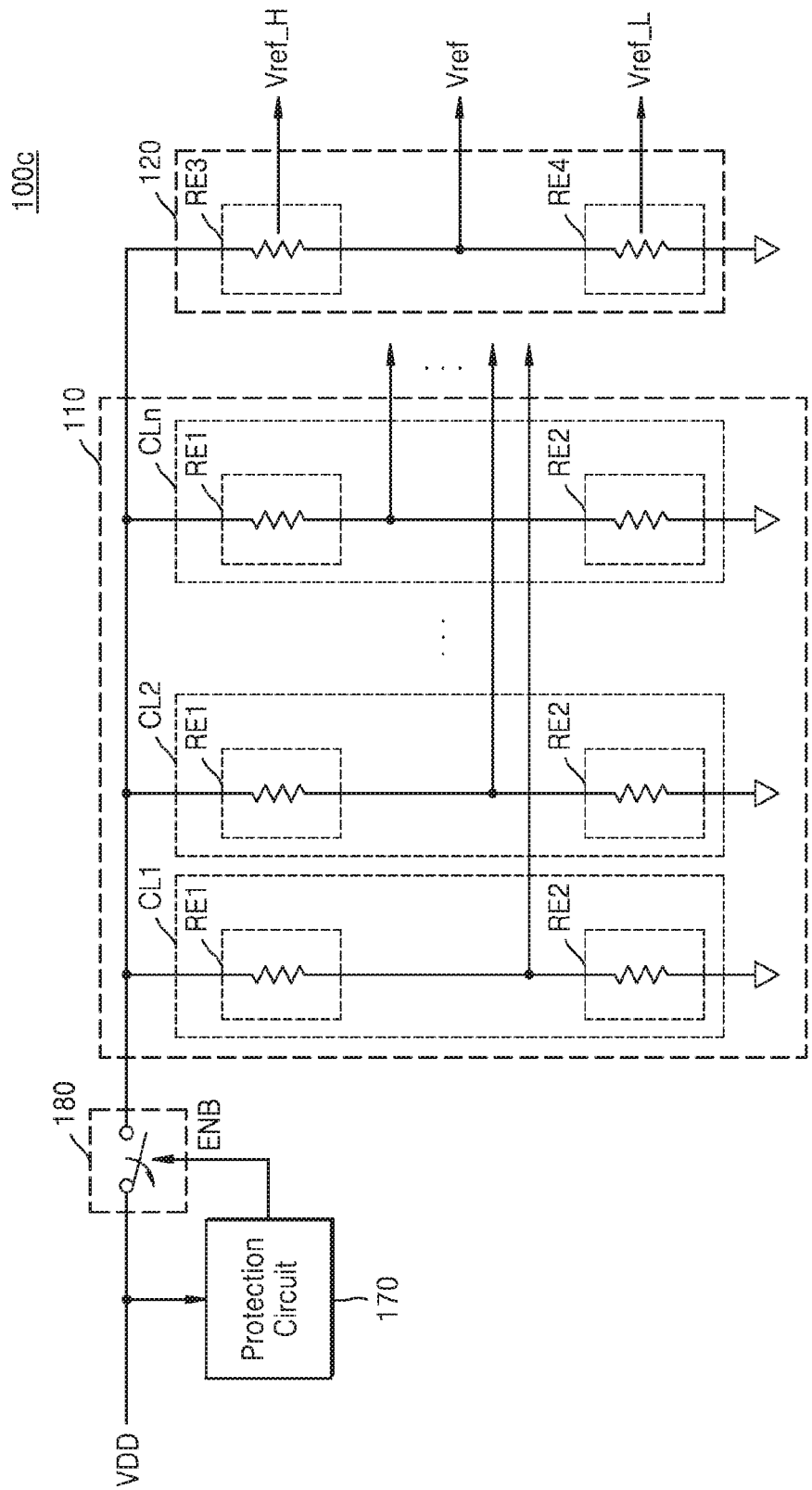
FIG. 10 is a circuit diagram of a PUF circuit according to an example embodiment of the inventive concept.

FIG. 10 is a circuit diagram of a PUF circuit 100*c* according to an example embodiment of the inventive concept.

The PUF circuit 100*c* of FIG. 10 may include a PUF cell array 110, a reference voltage generator 120, a protection circuit 170, and a block switch 180. Although not illustrated, the PUF circuit 100*b* may further include other configurations of the PUF circuit 100*a* described with reference to FIG. 2.

The protection circuit 170 may prevent generation of PUF data when a power voltage VDD is outside a rated voltage range. For example, the protection circuit 170 may generate a disable signal ENB if a power voltage VDD is equal to or less than a first threshold voltage, or if the power voltage VDD is equal to or higher than a second threshold voltage. The first threshold voltage and the second threshold voltage may be preset.

The block switch 180 may be turned off in response to a disable signal ENB so as to prevent a power voltage VDD from being supplied to the PUF cell array 110 and the reference voltage generator 120.

However, the block switch 180 is not limited thereto, and may be connected to the PUF cell array 110 or the reference voltage generator 120 to prevent a power voltage VDD from being supplied to the PUF cell array 110 or the reference voltage generator 120.

Figure 11:
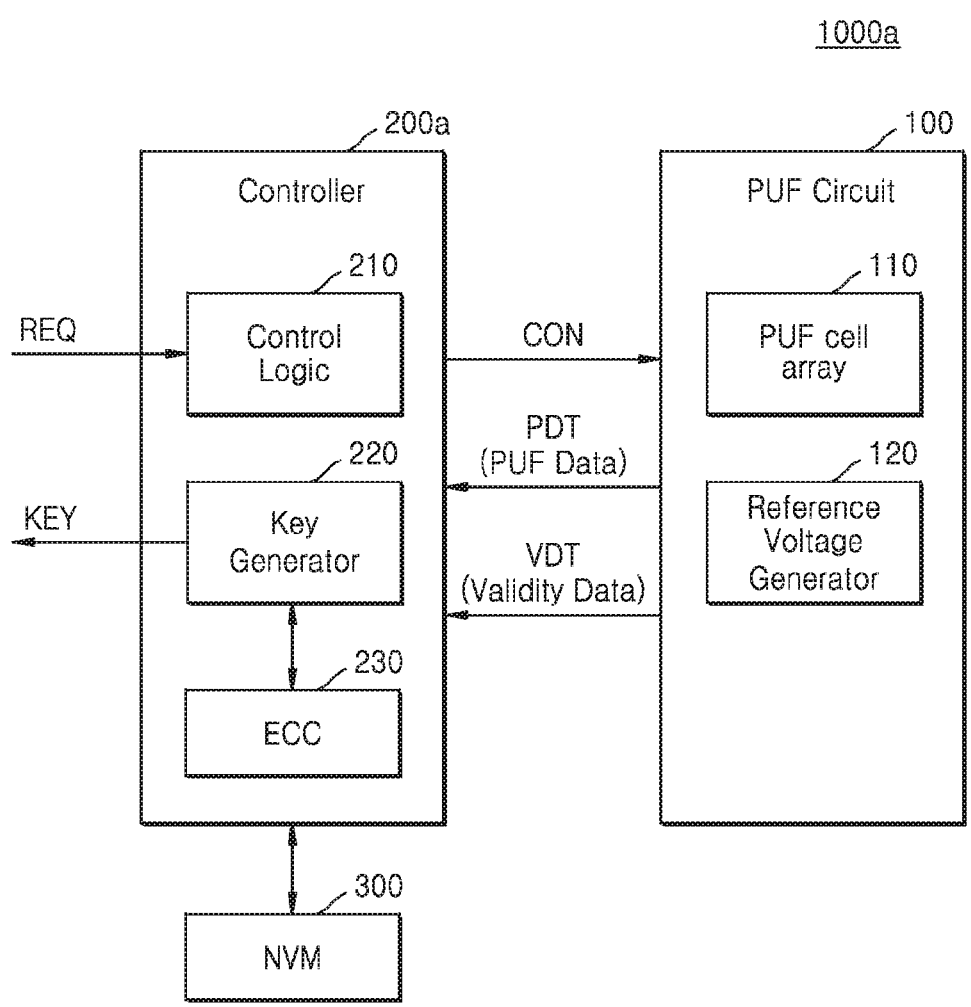
FIG. 11 is a block diagram of a PUF system according to an example embodiment of the inventive concept.

FIG. 11 is a block diagram of a PUF system 1000*a* according to an example embodiment of the inventive concept.

Referring to FIG. 11, the PUF system 1000*a* may include a PUF circuit 100, a controller 200*a*, and a non-volatile memory 300. The PUF circuit 100 may include a PUF cell array 110 and a reference voltage generator 120, and the controller 200*a* may include a control logic 210, a key generator 220, and an ECC circuit 230.

Compared with the PUF system 1000 of FIG. 1, the PUF system 1000*a* may further include the ECC circuit 230. When generating an initial authentication key KEY, that is, when registering an authentication key, the ECC circuit 230 may encode PUF data PDT to generate an ECC code for error correction, and may store the ECC code in the non-volatile memory 300. The key generator 220 may generate an authentication key KEY based on the encoded PUF data PDT.

Later when generating an authentication key KEY, the ECC circuit 230 may read the ECC code from the non-volatile memory 300, and decode the PUF data PDT provided by the PUF circuit 100 based on the read ECC code. The key generator 220 may generate an authentication key KEY based on the decoded PUF data PDT.

As described above with reference to FIG. 2, a BER of the PUF circuit 100 according to the example embodiment of the inventive concept may be relatively low. Thus, the ECC circuit 230 may include a simple ECC logic.

Figure 12:
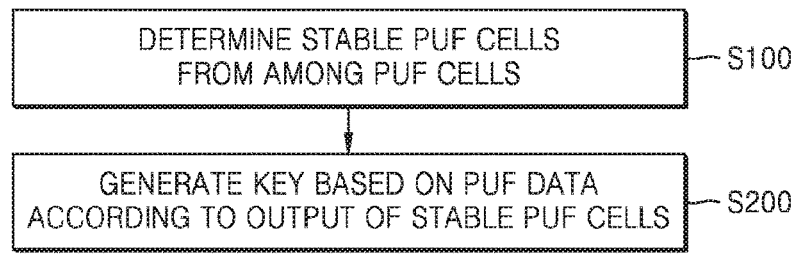
FIG. 12 is a flowchart of a method of operating a PUF system according to an example embodiment of the inventive concept.

FIG. 12 is a flowchart of a method of operating a PUF system according to an example embodiment of the inventive concept. The operating method of FIG. 12 may be performed on the PUF system 1000 of FIG. 1 or the PUF system 1000*a* of FIG. 11. Thus, description of the PUF system 1000 of FIG. 1 or the PUF system 1000*a* of FIG. 11 may be applied to the operating method of the PUF system according to the example embodiment of the inventive concept.

Referring to FIG. 12, the PUF system may determine stable PUF cells from among a plurality of PUF cells in a testing operation of a manufacturing process or an initialization process, or in a resetting operation of a PUF circuit (S100). The PUF system may test the plurality of PUF cells to determine whether output voltages of the plurality of PUF cells are in a dead zone. The PUF system may determine PUF cells having an output voltage in the dead zone as unstable PUF cells, that is, invalid PUF cells, and determine PUF cells having an output voltage not located in the dead zone as stable PUF cells, that is, valid PUF cells. The PUF system may generate a validity signal regarding each of the plurality of PUF cells, and store validity data including validity signals in a non-volatile memory.

Later, the PUF system may generate an authentication key in response to an authentication key request signal, and the PUF system may generate an authentication key based on PUF data according to output voltages of stable PUF cells (S200). The PUF system may distinguish between valid PUF cells and invalid PUF cells based on validity data stored in the non-volatile memory, and generate an authentication key based on data values of valid PUF cells.

Figure 13:
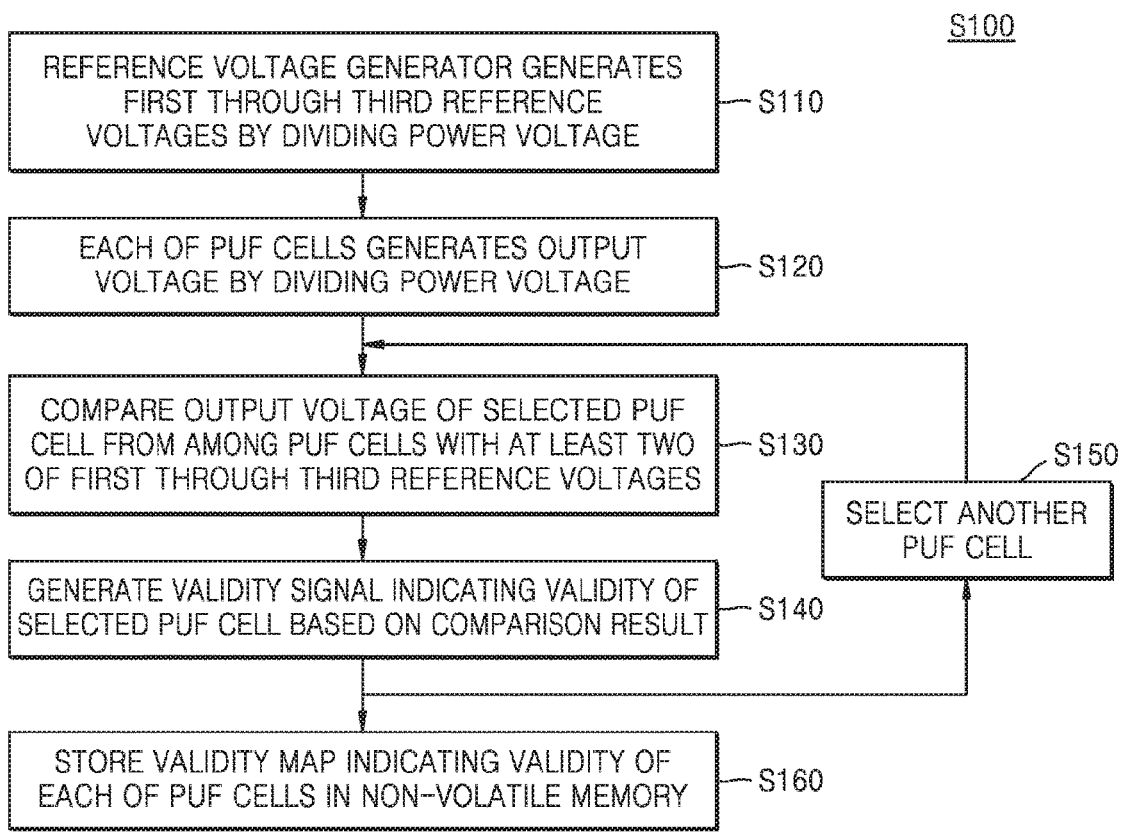
FIG. 13 is a flowchart of operation S100 of FIG. 12 according to an example embodiment.

FIG. 13 is a flowchart of operation S100 of FIG. 12 according to an example embodiment.

Referring to FIG. 13, a reference voltage generator may generate first through third reference voltages by dividing a power voltage using resistive elements (S110). The first reference voltage may be a reference voltage used to determine data values of PUF cells, and the second and third reference voltages may be reference voltages for setting a dead zone. The first reference voltage may be set to be half of a power voltage. The second reference voltage is higher than the first reference voltage, and the third reference voltage is lower than the first reference voltage.

Each of the plurality of PUF cells may generate an output voltage by dividing a power voltage (S120). Operation S120 may be simultaneously performed with operation S110. Each of the plurality of PUF cells may include serially connected resistive elements. As the resistive elements operate as a voltage divider, they may generate an output voltage by dividing a power voltage. The resistive elements may be designed to have identical resistance values, and the resistance values of the resistive elements may have an error due to mismatch in terms of a manufacturing process. Output voltages of the plurality of PUF cells may be set to be identical. For example, an output voltage of each of the plurality of PUF cells may be set to be half of a power voltage. However, due to an error in a resistance value of resistive elements, output voltages of the plurality of PUF cells may have a distribution.

A comparison circuit may compare an output voltage of a PUF cell selected from among the plurality of PUF cells, with at least two of the first through third reference voltages (S130), and a combinational logic may generate a validity signal indicating validity of the selected PUF cell based on a comparison result (S140). For example, the comparison circuit may compare an output voltage of the selected PUF cell with the first through third reference voltages to generate first through third comparison results. The combinational logic may generate a validity signal regarding the selected PUF cell based on the first through third comparison results.

Later, another PUF cell may be selected from among the plurality of PUF cells (S150). Operations S130 and S140 may be performed on the selected another PUF cell, and the combinational logic may generate a validity signal regarding the selected another PUF cell.

As operations S130, S140, and S150 are repeatedly performed, a validity signal regarding each of the plurality of PUF cells may be generated.

Validity data including validity signals respectively regarding the plurality of PUF cells may be stored in the non-volatile memory as a validity map (S160).

Figure 14:
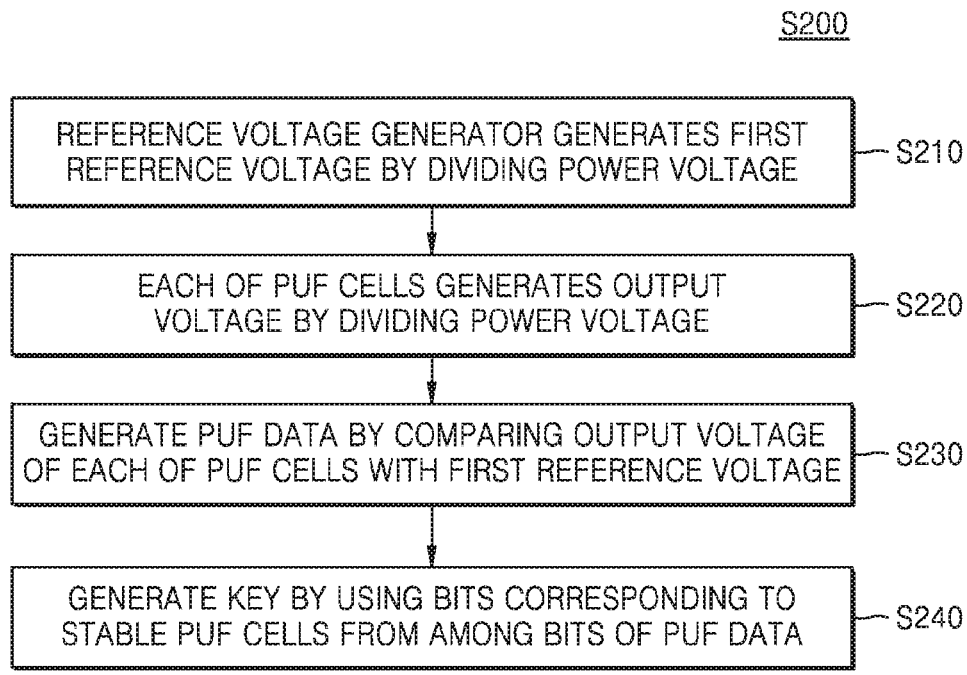
FIG. 14 is a flowchart of operation S200 of FIG. 12 according to an example embodiment.

FIG. 14 is a flowchart of operation S200 of FIG. 12 according to an example embodiment.

Referring to FIG. 14, a reference voltage generator may generate a first reference voltage by dividing a power voltage using resistive elements (S210).

A plurality of PUF cells may each generate an output voltage by dividing a power voltage (S220). Operation S220 may be simultaneously performed with operation S210.

A comparison circuit and a combinational logic may generate PUF data by comparing an output voltage of each of the plurality of PUF cells with the first reference voltage (S230). The comparison circuit and the combinational logic may compare an output voltage of a PUF cell with the first reference voltage to generate a data value regarding the PUF cell, and PUF data may include data values of the plurality of PUF cells. Each bit of PUF data may correspond to a data value of the plurality of PUF cells.

A controller may generate an authentication key using bits corresponding to stable PUF cells from among the bits of the PUF data (S240). The controller may read validity data stored in a non-volatile memory, and select bits corresponding to stable PUF cells from among the bits of PUF data, based on validity data, that is, select valid data values. The controller may generate an authentication key based on the valid data values.

Figure 15:
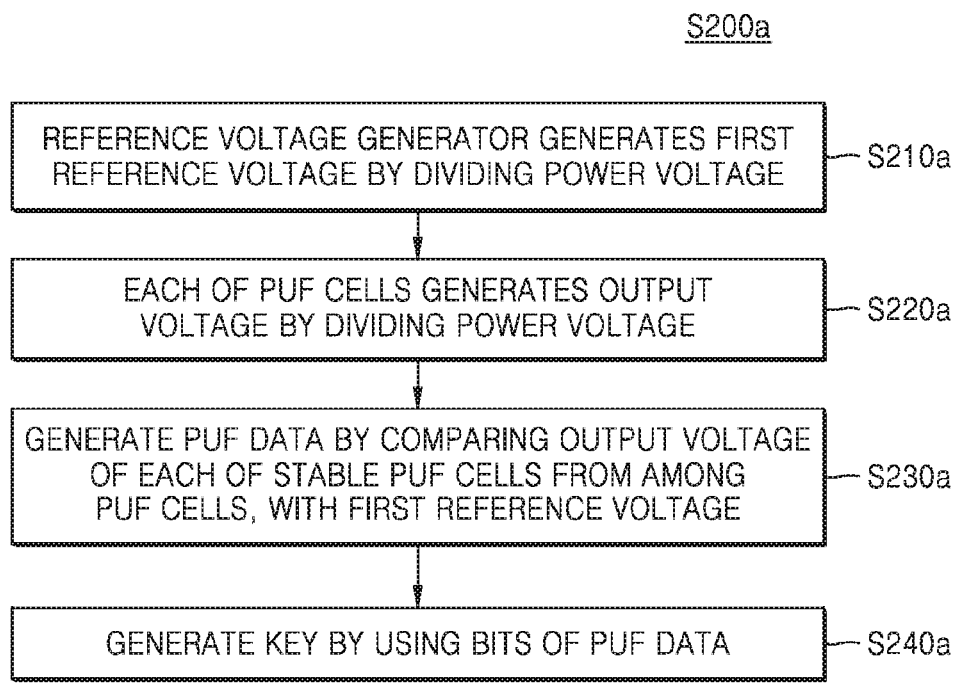
FIG. 15 is a flowchart of operation S200 of FIG. 12 according to an example embodiment.

FIG. 15 is a flowchart of operation S200 of FIG. 12 according to an example embodiment.

Referring to FIG. 15, a reference voltage generator may generate a first reference voltage by dividing a power voltage using resistive elements (S210a).

Each of a plurality of PUF cells may generate an output voltage by dividing a power voltage (S220a). Operation S220a may be performed simultaneously with operation S210a.

A comparison circuit and a combinational logic may generate PUF data by comparing output voltages of stable PUF cells from among a plurality of PUF cells (S230a). A controller may read valid data stored in a non-volatile memory, and provide a control signal that selects stable PUF cells, that is, valid PUF cells, based on the validity data, to a PUF circuit. Accordingly, output voltages of stable PUF cells may be sequentially provided to the comparison circuit. The comparison circuit may compare each of the output voltages of the stable PUF cells with the first reference voltage to output comparison results, and the combinational logic may generate PUF data based on the comparison results, that is, based on data values of the stable PUF cells.

The controller may generate an authentication key using bits of the PUF data provided by the PUF circuit (S240a). In an example embodiment, the controller may output PUF data as an authentication key.

Figure 16:
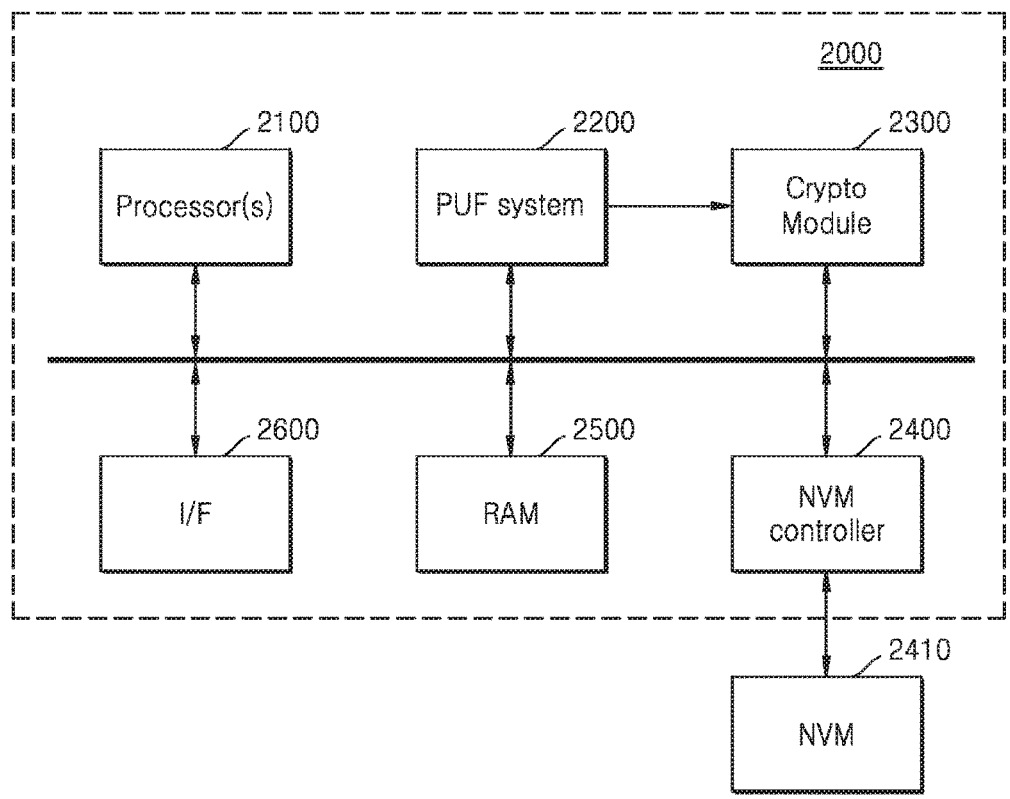
FIG. 16 is a block diagram illustrating an electronic device according to an example embodiment of the inventive concept.

FIG. 16 is a block diagram illustrating an electronic device 2000 according to an example embodiment of the inventive concept.

The electronic device 2000 may be one of various types of electronic devices on which encoding of data or security authentication is performed, such as an application processor, a smart card integrated chip (IC), a mobile device, a data storage medium (e.g., a solid state drive (SSD), a memory stick, or a universal flash storage (UFS) device), a memory card, (e.g., a security digital (SD) card, a multimedia card (MMC), or an embedded MMC (eMMC)), or a security device.

Referring to FIG. 16, the electronic device 2000 may include at least one processor 2100, a PUF system 2200, an encoding module 2300, a non-volatile memory controller 2400, a non-volatile memory 2410, a RAM 2500, and an interface 2600. The electronic device 2000 may further include other elements such as a communication module or an input/output device. In an example embodiment, if the electronic device 2000 is an application processor, the non-volatile memory 2410 may be included outside the electronic device 2000.

The processor 2100 may control an overall operation on the electronic device 2000. The processor 2100 may be implemented as a central processing unit (CPU), a microprocessor or the like, and may include a single-core processor or a multi-core processor.

The RAM 2500 may operate as a working memory of an internal system of the electronic device 2000. The RAM 2500 may include at least one of a volatile memory and a non-volatile memory. A code and/or application may be loaded on the RAM 2500 to manage or operate the electronic device 2000, and the processor 2100 may execute the code and/or application loaded on the RAM 2500. The code and/or application may be stored in the non-volatile memory 2410 or another storage device.

The interface 2600 may be connected to an input/output device (not shown) via a RGB interface, a CPU interface, a serial interface, a mobile display digital interface (MDDI), an inter integrated circuit (I2C) interface, a serial peripheral interface (SPI), a micro controller unit (MCU), a mobile industry processor interface (MIN), an embedded display port (eDP) interface, a D-subminiature (D-sub), an optical interface, a high definition multimedia interface (HDMI), a mobile high-definition link (MHL) interface, an SD card/multi-media card (MMC) interface, an infrared data association (IrDA) standard interface or the like.

The non-volatile memory controller 2400 may provide an interface between the non-volatile memory 2410 and other elements of the electronic device 2000 (for example, the processor 2100, the PUF system 2200, the encoding module 2300, or the like). Data to be stored in or read from the non-volatile memory 2410 may be received by the non-volatile memory 2410 or read from the non-volatile memory 2410 under the control of the non-volatile memory controller 2400.

The non-volatile memory 2410 may include one of an OTP memory, ROM, PROM, EPROM, EEPROM, a flash memory, PRAM, MRAM, RRAM, and FRAM.

A code and/or application for managing or operating the electronic device 2000 and user data may be stored in the non-volatile memory 2410. In addition, validity data generated in the PUF system 2200 may be stored in the non-volatile memory 2410.

The encoding module 2300 may perform an encoding and decoding operation on input/output data using an authentication key provided by the PUF system 2200.

The PUF system 2200 may generate an authentication key needed for security. In response to an authentication key request signal provided by the processor 2100 or the encoding module 2300, the PUF system 2200 may generate an authentication key, and provide the same to the encoding module 2300.

The PUF system 2200 described with reference to FIGS. 1 and 11 or the PUF circuit 100 described with reference to FIG. 2 may be applied to the PUF system 2200. The PUF system 2200 may be implemented as hardware, a combination of hardware and software or a combination of hardware and firmware.

The PUF system 2200 may generate data values of PUF cells by comparing output voltages of the PUF cells, which are generated by dividing a power voltage using resistive elements, with a reference voltage generated by dividing the power voltage using resistive elements. Accordingly, the data values of the plurality of PUF cells may be maintained uniform regardless of a change in the environment.

In addition, the PUF system 2200 may set a dead zone having a sufficient margin with respect to a reference voltage used in determining data values of PUF cells, for example, a first reference voltage, and blocking those PUF cells having an output voltage in the dead zone to thereby reduce a BER of the PUF system 2200. Accordingly, a complicated ECC logic is not necessary.

As the PUF system 2200 generates validity data in a simple manner by comparing reference voltages generated through voltage division, for example, a second reference voltage, with output voltages of a plurality of PUF cells, the time and costs for testing conducted to determine unstable PUF cells may be saved.

While the inventive concept has been particularly shown and described with reference to example embodiments thereof, it will be understood by those of ordinary skill in the art that various changes in form and details may be made therein without departing from the spirit and scope of the inventive concept as defined by the following claims.

What is claimed is:

1. A physical unclonable function (PUF) circuit comprising:
   a plurality of PUF cells configured to generate output voltages by dividing a power voltage;
   a reference voltage generator comprising a plurality of resistive elements connected in series, the reference voltage generator configured to generate a first reference voltage, a second reference and a third reference voltage by dividing the power voltage using the plurality of resistive elements, the second reference voltage being higher than the first reference voltage, the third reference voltage being lower than the first reference voltage;
   a comparing circuit configured to generate a first comparison result, a second comparison result and a third comparison result for a PUF cell from among the plurality of PUF cells by comparing an output voltage of the PUF cell with each of the first reference voltage, the second reference voltage and the third reference voltage; and
   a determining logic configured to determine a data value of the PUF cell based on the first comparison result, and determine stability of the PUF cell based on the first comparison result, the second comparison result and the third comparison result.

2. The PUF circuit of claim 1, wherein each of the plurality of PUF cells comprises at least two homogeneous resistive elements, and
   the plurality of PUF cells generate the output voltages that are in different levels based on mismatch between the at least two homogeneous resistive elements.

3. The PUF circuit of claim 1, wherein each of the plurality of PUF cells comprises a first resistor and a second resistor that are serially connected,
   the power voltage is applied to a first end of the first resistor, and
   a voltage of a second end of the first resistor is output as one of the output voltages.

4. The PUF circuit of claim 3, wherein the reference voltage generator comprises a third resistor comprising a first group of the plurality of resistive elements and a fourth resistor comprising a second group of the plurality of resistive elements, and the third resistor and the fourth resistor are serially connected,
   the power voltage is applied to a first end of the third resistor,
   a voltage of a second end of the third resistor is output as the first reference voltage, and
   mismatch between the first resistor and the second resistor is greater than mismatch between the third resistor and the fourth resistor.

5. The PUF circuit of claim 4, wherein resistance values of the first resistor and the second resistor are the same,
   resistance values of the third resistor and the fourth resistor are the same, and
   a width of the third resistor is greater than a width of the first resistor.

6. The PUF circuit of claim 1, wherein the determining logic determines the PUF cell to be a stable PUF cell when the output voltage of the PUF cell is at a level equal to or higher than the second reference voltage, or at a level less than the third reference voltage.

7. The PUF circuit of claim 1, wherein the reference voltage generator comprises a first resistor string comprising a first group of the plurality of resistive elements and to which the power voltage is applied, and a second resistor string comprising a second group of the plurality of resistive elements, the first resistor string and the second resistor string are connected in series,
   a voltage of one of a plurality of nodes of the first resistor string, which is selected based on a first setting signal, is output as the second reference voltage, and
   a voltage of one of a plurality of nodes of the second resistor string, which is selected based on a second setting signal, is output as the third reference voltage.

8. The PUF circuit of claim 1, wherein the reference voltage generator further comprises:
   a bandgap reference circuit configured to generate a reference current based on the power voltage and provide the reference current to the plurality of resistive elements.

9. The PUF circuit of claim 1, wherein the power voltage is provided by a regulator circuit.

10. The PUF circuit of claim 1, further comprising a protection circuit configured to sense a level of the power voltage,
    wherein when a level of the power voltage is outside a rated voltage range, the protection circuit blocks an operation of at least one of the reference voltage generator and the comparing circuit.

11. The PUF circuit of claim 1, wherein the comparing circuit comprising:
    a first comparator configured to generate the first comparison result by comparing the output voltage of the PUF cell with the first reference voltage,
    a second comparator configured to generate the second comparison result by comparing the output voltage of the PUF cell with the second reference voltage, and
    a third comparator configured to generate the third comparison result by comparing the output voltage of the PUF cell with the third reference voltage.

12. The PUF circuit of claim 1, wherein the comparing circuit comprising:
    a comparator configured to sequentially generate the first comparison result, the second comparison result and the third comparison result, and
    a switching circuit configured to sequentially provide the first reference voltage, the second reference voltage and the third reference voltage to the comparator in response to a selection signal.

13. A physical unclonable function (PUF) system comprising:
    a PUF circuit comprising a plurality of PUF cells, the PUF circuit being configured to determine data values of the plurality of PUF cells by comparing output voltages of the plurality of PUF cells with a first reference voltage generated by dividing a power voltage and to generate validity data indicating validity of the data values of the plurality of PUF cells by comparing the output voltages of the plurality of PUF cells with a second reference voltage and a third reference voltage generated by dividing the power voltage, the second reference voltage being higher than the first reference voltage and the third reference voltage being lower than the first reference voltage; and
    a controller configured to control the PUF circuit and to generate a key based on the data values of the plurality of PUF cells and the validity data.

14. The PUF system of claim 13, wherein each of the plurality of PUF cells comprises a first resistive element connected to a power voltage, and a second resistor element serially connected to the first resistive element, and the first resistive element and the second resistive element have identical target resistance values.

15. The PUF system of claim 13, wherein
the PUF circuit determines data values of PUF cells having an output voltage between the second reference voltage and the third reference voltage, from among the plurality of PUF cells, to be invalid.

16. The PUF system of claim 13, wherein the controller selects valid data values from among the data values of the plurality of PUF cells, based on the validity data, and the controller outputs the selected valid data values as the key.

17. The PUF system of claim 13, wherein the controller selects valid data values from among the data values of the plurality of PUF cells, based on the validity data, and
the controller performs error check and correction (ECC) based on the selected valid data values, and generates the key based on data on which the ECC is performed.

18. An integrated circuit having a physical unclonable function (PUF), the integrated circuit comprising:
a plurality of PUF cells configured to generate output voltages, each of the output voltages being generated by dividing a power voltage based on at least two resistors;
a reference voltage generator configured to generate a first reference voltage, a second reference voltage and a third reference voltage by dividing the power voltage based on a resistor string, the second reference voltage being higher than the first reference voltage, the third reference voltage being lower than the first reference voltage;
a comparison circuit configured to compare the output voltages of the plurality of PUF cells with each of the first reference voltage, the second reference voltage and the third reference voltage to generate a first comparison result, a second comparison result and a third comparison result for each of the output voltages of the plurality of PUF cells; and
a combinational logic configured to generate validity data indicating validity of each of the plurality of PUF cells based on at least two of the first comparison result, the second comparison result and the third comparison result.

19. The integrated circuit of claim 18, further comprising a non-volatile memory configured to store the validity data.

20. The integrated circuit of claim 18, wherein the comparison circuit compares the output voltages of the plurality of PUF cells with the first reference voltage in response to an authentication key request signal, and outputs the first comparison results as data values of the plurality of PUF cells.

* * * * *